Figures 1, 2:
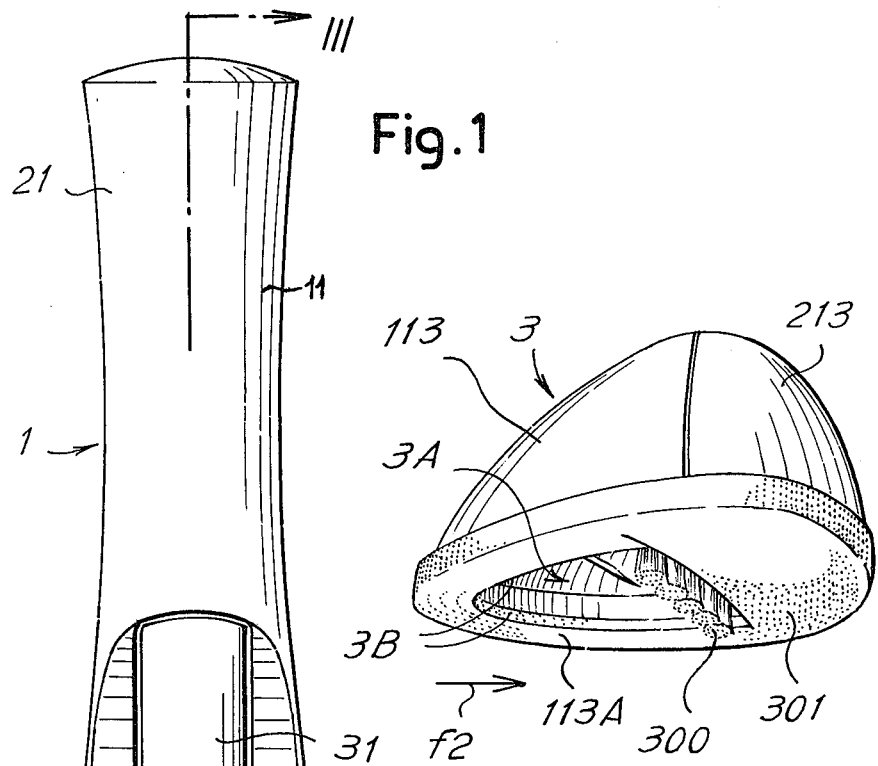

United States Patent [19]

Bernardini

[11] 4,083,073
[45] Apr. 11, 1978

[54] DEVICES FOR NEUTRALIZING ELECTROSTATIC CHARGES AND REMOVING DUST AND PARTICLES FROM RECORDING DISCS AND THE LIKE

[76] Inventor: Leandro Bernardini, 11, Via Mazzini, Calenzano, Firenze, Italy, I-50041

[21] Appl. No.: 747,633

[22] Filed: Dec. 6, 1976

[30] Foreign Application Priority Data

Mar. 31, 1976 Italy ................................. 9395 A/76

[51] Int. Cl.² ............................................... G11B 3/58
[52] U.S. Cl. .................................. 15/1.5 A; 361/212; 274/47
[58] Field of Search .......................... 15/1.5 R, 1.5 A; 361/212, 213, 221, 260; 310/8.7; 274/47

[56] References Cited

U.S. PATENT DOCUMENTS

| 3,355,755 | 12/1967 | Brooks | 15/1.5 A |
| 3,395,042 | 7/1968 | Herbert, Jr. | 15/1.5 R X |
| 3,716,755 | 2/1973 | Marx | 361/221 X |
| 3,997,817 | 12/1976 | Secker | 361/213 |

FOREIGN PATENT DOCUMENTS

| 651,720 | 1/1963 | Italy | 15/1.5 R |

Primary Examiner—Edward L. Roberts
Attorney, Agent, or Firm—J. Harold Nissen

[57] ABSTRACT

A device for neutralizing electrostatic charge and removing dust and particles attracted by the charges on a gramaphone record or disc, the device comprising a body; a handle on the body for hand operation of the device adjacent to a surface of the disc to be treated; a cap head and a pushbutton on the body; at least one ionic flux- and electric field- generating electrode within the cap head; a piezoelectric generator in the body activated by the pushbutton; and brush means on at least a portion of an edge of the cap to remove dust from said surface immediately after said surface has passed in front of the cap and has been subjected to the action of ionic flux and electric field from the electrode.

10 Claims, 5 Drawing Figures

U.S. Patent    April 11, 1978    Sheet 1 of 3    4,083,073

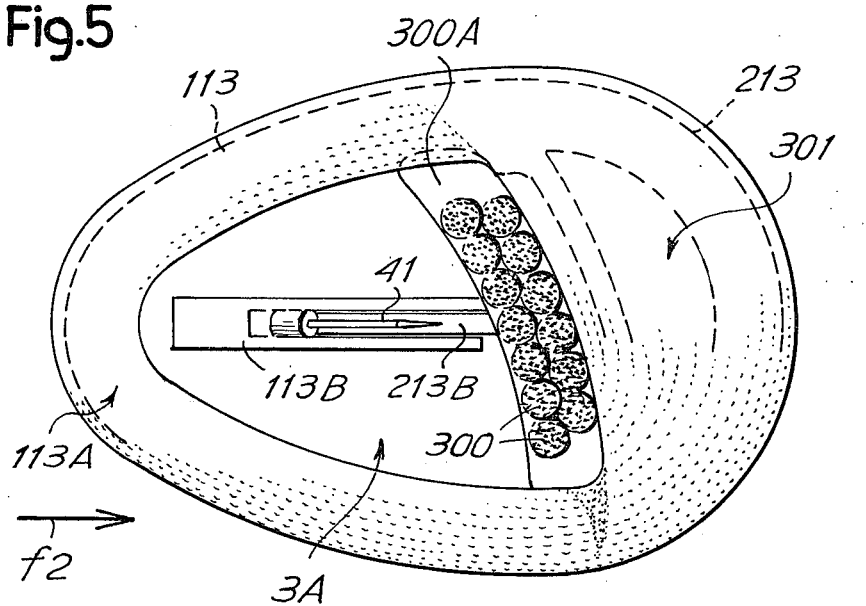
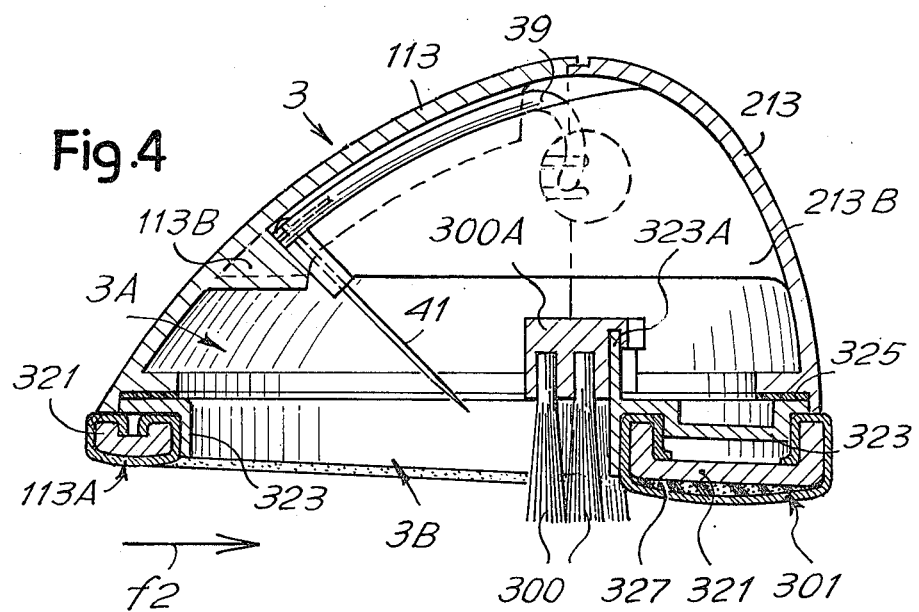

DEVICES FOR NEUTRALIZING ELECTROSTATIC CHARGES AND REMOVING DUST AND PARTICLES FROM RECORDING DISCS AND THE LIKE

This invention relates to devices for neutralizing electrostatic charges and eliminating dust and particles attracted by said charges to gramaphone records or discs.

Gramaphone records or discs are made of a material which very easily acquires static charge. This not only attracts dust particles charged with or opposite sign suspended in air, but it also makes all attempts at cleaning such discs difficult. Both for cleaning and for keeping such discs clean, it is necessary to neutralize thoroughly concentrations of opposite electric charges which for different reasons are formed on the surfaces of the discs.

According to the present invention there is provided a device for neutralizing electrostatic charge and removing dust and particles attracted by the charges on a gramaphone record or disc, the device comprising a body with a handle for hand operation of the device adjacent to a surface of the disc to be treated, the body having a cap head; at least one ionic flux- and electric field- generating electrode within the cap head, the electrode being supplied by a piezo-electric generator in the body and activated by a push-button; and brush means on at least a portion of an edge of the cap to remove dust from said surface immediately after said surface has passed in front of the cap and has been subjected to the action of ionic flux and electric field from the electrode.

Figure 3:
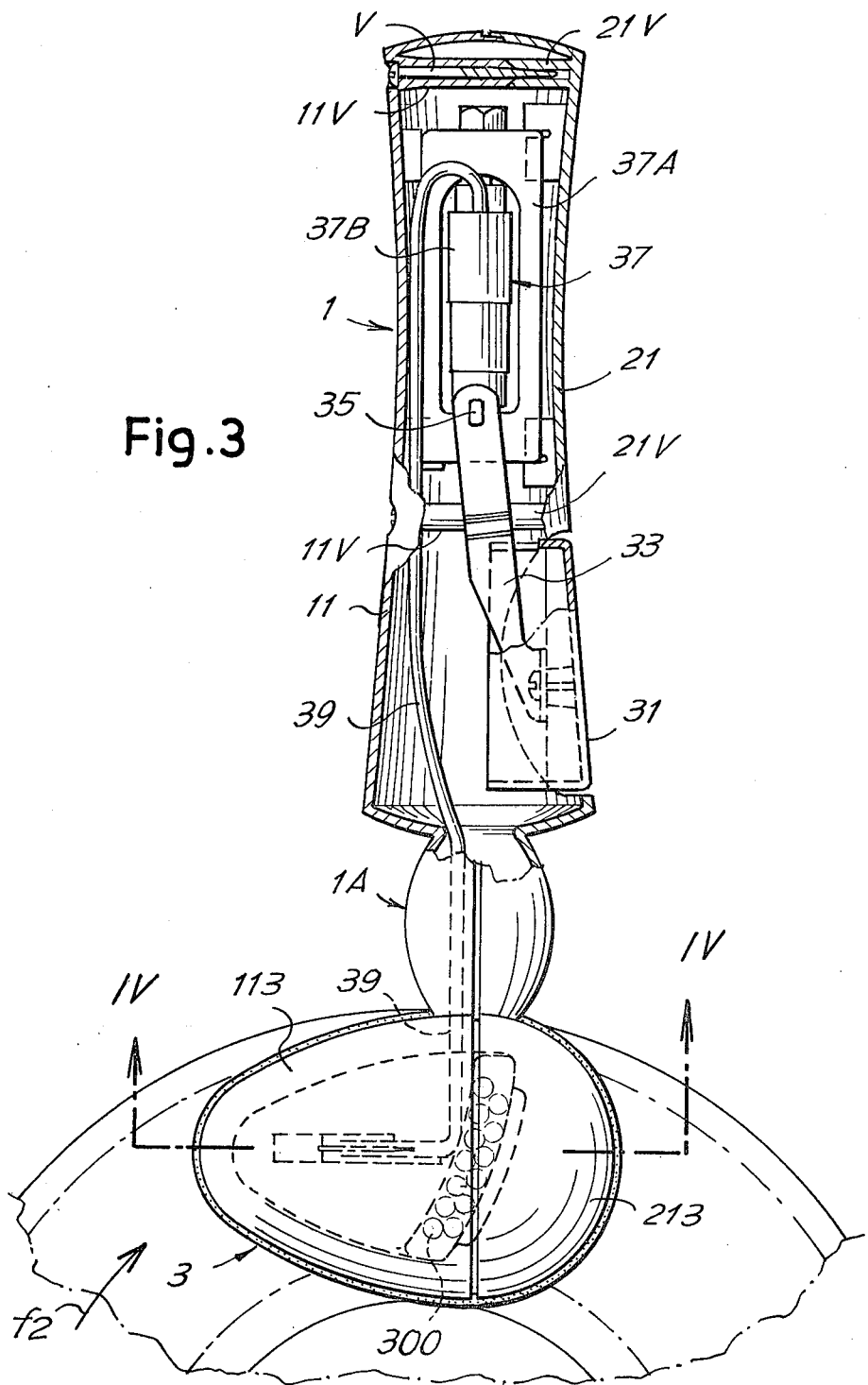

A device embodying the invention will now be described, by way of example, with reference to the accompanying diagrammatic drawings in which:

FIG. 1 is a side view of the device;
FIG. 2 is a perspective view of the device substantially in the direction of arrow II of FIG. 1;
FIG. 3 is a section on line III—III of FIG. 1;
FIG. 4 is a section on line IV—IV of FIG. 3; and
FIG. 5 is a view on line V—V of FIGS. 1 and 4.

The illustrated device has a handle body 1 and an operative head 3. The handle 1 has a tapered extension portion 1A which joins the head 3. The head 3 is elongate and egg shaped, and it has a flattened active portion with an open cavity 3A. A unit for emitting ions, i.e. a flux of charge and for ionization, is located in cavity 3A. The flat portion of the head is inclined to the longitudinal axis of the handle 1 so that when the flat portion of the head is parallel to the surface to be treated, the handle is itself slightly inclined thereto.

The handle 1 consists of two half-shells 11 and 21. The half-shell 21 has a wide opening with a pushbutton 31 extending therethrough for controlling an electric charge generator 37. This pushbutton 31 engages one end of an arm 33, which is linked by a pin 35 to the generator 37. The generator 37 is of known type, and it includes a frame 37A, to which a cam member is linked, the membering being integral with the pin 35 and arranged to compress a piezo-electric body 37B against the frame 37A. A protected conductor 39 extends in the cavity in the handle 1 and in the portion 1A, to reach an emitting tip 41. The tip 41 is fitted in a projection 113B in section 113 of the head 3, which is formed in one piece with the half-shell 11. The head 3 is completed by a section 213 formed in one piece with the half-shell 21, and it has a spur 213B which locks the tip 41 against the projection 113B. The tip 41 is inclined within cavity 3A, and the bottom of cavity 3A is open, that is to correspond with the flattening of an elongate window 3B in the head 3. A peripheral arched edge corresponding to the portion 113 of the head 3 has a relatively soft packing 113A made of fabric, felt, velvet or the like. The slightly-inclined, intermediate transverse edge of the opening 3B has brush means 300 therein, formed from relatively thin bristles which are capable of penetrating into the micro-grooves of recording discs to assure cleaning of the surface of micro-discs or the like treated with the device. This is effected by movement of the surface of the disc with respect to the head 3, as shown by the arrow $f2$. This movement can be provided in practice by rotation of the disc on a record-player with the device inclined so that the inclined surface of the head 3 is parallel and close to the surface to be treated, which slides under the head 3 in the direction of arrows $f2$.

Adjacent to and behind the brush 300, is a packing 301 of felt or velvet, which provides more protection than packing 113A. This packing 301 serves both to capture particles removed from the discs and to form a bearing for the bristles, which are thus not deflected backwards and penetrate into the grooves of the disc. The fabric forming the packings 113A and 301 engages a frame 321 with co-operation of a counter-frame 323 which can be fitted in a replaceable manner to the head 3 by means of an adhesive layer 325. The counter-frame 323 has an edge 323A which engages the body 300A of the brush 300 and forms a support for the bristles of the brush 300. The higher packing 301 is of a synthetic foam layer 327.

The area of the surface to be treated, which is instantaneously in front of the opening 3B of the head 3, is subjected to ionic flux and to bombardment with charges emitted by the tip 41 fed by the generator 37. This occurs when the pushbutton 31 is slowly pressed and released by repeated action of an operator's thumb holding the handle 1. Charges generated in the generator 37 by the piezo-electric effect, reach very high voltages. These changes are supplied to the tip 41 through the conductor 39. Other dissipation areas are shielded by the insulating material constituting the shells 11 and 21, and protection is provided for coupling screws V which have sheaths 11V and 21V formed in the half-shells 11 and 21. The tip 41 creates such a high electric field and ionic flux for ionization of air in the cavity 3A that electrostatic charge on the surface to be treated is neutralized. Particles adhering even in the grooves of the disc can thereby be removed. An immediate mechanical separation is thereby assured using the brush 300, which acts immediately after a surface has passed in front of the opening 3B of the head 3, during movement in the direction of arrows $f2$ relative to the head 3.

In order to neutralize electric charges on the surface of a disc, it is necessary to create a proper bombardment with ions. The tip 41 is therefore pin-shaped with the sharpest tip possible, in order to obtain a very high density of charge, and consequently in close proximity thereto a very intense electric field capable of ionizing air.

Ions of opposite sign to the charge on the tip 41 are attracted thereby and discharge it, while ions of the same sign are repelled towards the disc surface and are attracted by charges of opposite sign, which are thus neutralized. The ions repelled by the tip 41 form a flux comparable with an "air" draught. For this reason, the head 3 is made of a material having very good insulation properties and it should be such as to direct this "electric wind" onto the record surface without allowing the electric field and the ionic flux to be dispersed. The head 3 has a shape designed for this purpose, with a cavity 3A. Moreover, the distance of the tip 41 from the brushes 300 is important as it determines the intensity of the electric field, and generally the shape of the head 3 and the inclination of the tip 41 are such that ionic flux is conveyed onto the surface of the disc to be treated. The shape of the head 3 contains and directs ionic flux and electric field in order to neutralize electrostatic charges and subsequently to clean the surface of the disc. The action of the electric field is combined with the mechanical action of the brush-pad unit. Coupling with the brush-pad unit is provided, and the electrode is kept at a distance and at a certain inclination to the record surface and the sides of the head.

The dimensions of the head 3, and especially its width perpendicular to the direction of the arrows f2, are such as to allow the whole surface of a disc to be treated in a few operations, even large diameter types. In particular, the head 3 has a width slightly less than half of the radial width of the grooved region of a large disc, and it is substantially equal to the radial width of a 45 r.p.m. disc.

The brush-pad unit 300–301 is made of a material which does not charge the surface of the treated disc, and it is of a shape such as to allow the collection and progressive removal of dust while the disc rotates on a turn-table. The brush 300 can, for instance, by made from nylon yarn or very fine terylene yarn, while the areas 113A and 301 are of cotton velvet to allow the head to rest on the disc without scratching it. More particularly, the fabric portion 113A preceding the brush 300 (with respect to the direction of the arrows f2) has only a protective function, and it does not serve to clean the record. The brush 300 is formed from very fine yarn and it is slightly higher than the pad 301 (of velvet, or the like) as it must penetrate into the microgrooves of the disc to remove dust which has not been removed by the electric field, owing to moisture or other reasons, so that it is intercepted by the upper portion of the same brush. The pad 301, besides offering the possibility of calibrating the distance of the head and of the brush from the record surface, particles of dirt raised by the electric field to be removed by the brush with respect to the direction of movement of the head. It does not allow collected dirt (the disc during the cleaning operation must be kept rotating) to be dispersed and facilitates the removal thereof. For this purpose, the brush is inclined outwardly and rearwardly, so as to forward particles towards the periphery of the disc, this being effected by moving the head 3 from the centre of the outside of the disc.

The brush and the rear pad should logically be made of a conductive material, in order to assure that the surface of the disc after removal of any electrostatic charge, is not charged by rubbing with the brush or pad. The bristles of the brush and the rear pad can therefore be manufactured from a metal material, such as not to scratch the surface of the disc to be treated (white metals for instance), or a synthetic material or the like made conductive by metalization.

However, this is not essential for the working of the presently-described device, as the high intensity of the electric field, and the ionic flux, prevent the surface of the disc from being charged, which could result from subsequent contact with the brush-pad unit.

The position and orientation of the pushbutton 31 allow it to be pressed and released without the head 3 being urged against the disc being treated. The head 3 should, in fact, rest or nearly rest, on the disc. The shape of the handle and the inclination of the head with respect thereto have been studied to allow the handle to be gripped easily and therefore the device to be used easily. The shape of the pushbutton 31 has been designed to extend the lever arm 33 to allow a light pressure or force to be used during compression of the quartzes of the piezo-electric generator.

The hereinbefore described device subjects the surface of a disc to a rain of negative and positive ions. However, this alone would not be sufficient. A neutralization of superficial electrostatic charges, even if it undoubtedly facilitates subsequent cleaning of the disc, does not allow a "perfect cleaning" of the disc since very fine dust which penetrates into the interior of the grooves in the disc cannot be removed. In order to remove this dust, the device not only neutralizes surface electrostatic charge, but also uses the electric field to remove particles which become detached from the surface. This action is completed by mechanical removal means having brushes and/or velvet for the particles, which the electric field has moved and raised high enough to enable them to be removed even from the micro-grooves of the disc.

The electric field, i.e. the ionic flux, should be variable in intensity and sign. In order to achieve this, the device has a brush and/or a velvet pad which not only creates opposite sign electric fields, but also a rain of ions of different sign. This is obtained with the hereinbefore described device using the properties of a piezo-electric ceramic. Percussion or compression of two piezo-electric ceramic cylinders results in a difference in potential being generated between the bases of the cylinders, which creates a bunching of charges on a conductor (electrode) contacting two bases having the same sign as the cylinders. This charge is sufficiently high to allow it to be emitted and to form an electric field which ionizes the air which is required for the desired purposes.

I claim:

1. A device for neutralizing electrostatic charges and removing dust and particles attracted by the charges on a gramaphone record or disc, comprising:

an operative cap head including a base having a flat portion, said head having a cavity opening towards said flat portion, said flat portion including an edge surrounding said cavity;

a handle joined to said operative head for hand operation of the device with said flat portion adjacent to a surface of the disc to be treated;

a piezo-electric generator in said handle, and at least one ionic flux and electric field generating electrode within said cap head operatively connected with said generator, said electrode projecting into said cavity above said flat portion to neutralize the dust and particles when energized by said generator;

a push-button associated with said handle for controlling said generator and energizing said electrode; and a brush-pad unit associated with said electrode and carried by said cap, said brush pad unit mechanically removing the dust particles neutralized by said electrode;

said brush pad-unit including:

brush means on a back portion of said edge inwardly thereof, and a relative soft packing on said flat portion rearwardly of said brush means said brush means extending from said cavity beyond said flat portion to the rear of said electrode in the direction of movement of said record or disc and between said electrode and said soft packing in the direction of travel of the surface, said brush means extending through said base beyond said packing to remove dust from said surface and to penetrate into the micro-grooves to remove dust which has not been removed, immediately after the surface has passed in front of said cap and said electrode and has been subjected to the action of ionic flux and electric field from said electrode.

2. A device according to claim 1, wherein the soft packing is of felt, velvet, fabric or flock.

3. A device according to claim 1, wherein the electrode projects into the cap head at an acute angle to the surface to be treated and is spaced therefrom to spray the flux on the whole surface to be treated which is instantaneously located under of the cap cavity.

4. A device according to claim 1, wherein said piezoelectric generating unit is spaced from the head, and the pushbutton is adjacent the head and rigidly connected to an arm linked on the handle framework for activating the unit.

5. A device according to claim 1, wherein:

said brush means includes a brush having bristles, said bristles being inclined backwards with respect to said electrode and outwardly with respect to said electrode and said cavity; and, said bristles and said soft packing are electrically conductive.

6. A device according to claim 1, wherein:

said relatively soft packing is electrically conductive;

said packing being distributed over the edge surrounding said cavity with the greater portion being juxtaposed to said brush means;

said packing in advance of said electrode and said brush means serving to protect the disc, and said packing to the rear of said electrode and adjacent to said brush means serving to calibrate the distance of said head and said brush means from the surface of the disc as well as facilitating the removal of the dust.

7. A device according to claim 1, wherein:

said head is elongated and egg-shaped and having a major axis;

said flat portion being inclined with respect to the axis of said handle;

said flat portion has a semi-oval opening, into said cavity, with its rear portion wider transverse to said major axis than its front portion, said flat portion having its rear portion wider than its front portion transverse to said major axis and having its rear portion longer than its front portion along said major axis, and said brush means being positioned within said semi-oval opening adjacent to said rear portion of said flat portion and being inclined away from said front portion thereof.

8. A device according to claim 1, including:

a pad on the front edge of said cap, said front edge of said cap being slightly less projecting than said pad; and, a soft packing provided on the whole edge of said cavity and forming a continuous packing unit with the packing rearwardly of said brush means, to prevent damage to the surface to be treated by said head.

9. A device according to claim 1, wherein:

said head is formed of two half-shells;

a spur on one of said half-shells, said spur locking said electrode to said other half-shell in advance of said brush-pad unit and extending in said cavity in a direction towards said brush-pad unit from said other half-shell;

said other half-shell having a peripheral arched edge;

a relatively soft packing on said peripheral arched edge;

said one half-shell having a slightly inclined, intermediate transverse edge, said arched edge together with said transverse edge forming said cavity surrounding edge;

said brush-pad unit including a brush with micro-groove penetrating bristles along said transverse edge, and packing behind and adjacent to said bristles;

said cavity surrounding edge having a width substantially equal to the radial width of a 45 r.p.m. disc.

10. A device according to claim 1, wherein:

said flat portion has a substantially egg-like section with a flattened region having a semi-oval recess therein;

said brush means extending through said semi-oval recess;

the major axis of the head is transverse to the axis of said handle; and, the flat portion is inclined with respect to the longitudinal axis of said handle.

* * * * *